(12) United States Patent
Lawrence

(10) Patent No.: US 6,237,907 B1
(45) Date of Patent: May 29, 2001

(54) METHOD AND APPARATUS FOR MACHINING A RADIUS OR DIAMETER FEATURE AT NON SYMMETRICAL LOCATIONS ON A WORKPIECE

(76) Inventor: Joseph W. Lawrence, 21702 Erie St., Saegertown, PA (US) 16433

( * ) Notice: Subject to any disclaimer, the term of this patent is extended or adjusted under 35 U.S.C. 154(b) by 0 days.

(21) Appl. No.: 09/576,348

(22) Filed: May 22, 2000

Related U.S. Application Data

(63) Continuation-in-part of application No. 09/370,177, filed on Aug. 9, 1999, now Pat. No. 6,065,744.

(51) Int. Cl.[7] ...................................................... B23Q 3/00
(52) U.S. Cl. .............................. 269/287; 269/902; 29/559
(58) Field of Search ..................................... 269/387, 902, 269/287, 101, 172, 268; 29/559

(56) References Cited

U.S. PATENT DOCUMENTS

| | | | |
|---|---|---|---|
| 1,349,963 | * 8/1920 | Jerrim | 269/156 |
| 1,372,661 | * 3/1921 | Secord | 269/142 |
| 3,094,821 | * 6/1963 | Eckert | 269/82 |
| 3,887,202 | * 6/1975 | Zapart | 451/404 |
| 4,340,211 | * 7/1982 | Chiappetti | 269/902 |
| 5,005,813 | * 4/1991 | Lawrence | 269/902 |
| 5,305,557 | * 4/1994 | Warncke | 269/902 |
| 6,065,744 | * 5/2000 | Lawrence | 269/902 |

FOREIGN PATENT DOCUMENTS

1097919 * 1/1961 (DE) ..................................... 269/902

* cited by examiner

Primary Examiner—Joseph J. Hail, III
Assistant Examiner—Daniel Shanley
(74) Attorney, Agent, or Firm—James F. Cottone

(57) ABSTRACT

A method and apparatus for machining a radius or diameter defined feature at locations on a workpiece that are not symmetrically with respect to the workpiece boundaries, wherein the method employs a simplified and precise set up process which assures exact feature location; and the apparatus for implementing the method employs a dual jawed adjustable workpiece holder formed as a highly versatile V-block device wherein the V-point may be precisely shifted in vernier increments along both X and Y axes responsive to user input controlled translations of one or both adjustable jaws along parallel axes. A baseline method employs determining first and second distances from a feature central axis and first and second boundary points on the workpiece, and then using a 90 degree technique to first adjust the workpiece holder in translation and then adjust an adjustable V-block jaw. A number of distinct embodiments of workpiece holders may be used in combination with various surface grinding machines and clamping mreans to retain a workpiece on which a non symmetrical feature is to be machined with a high degree of positional repeatability.

4 Claims, 8 Drawing Sheets

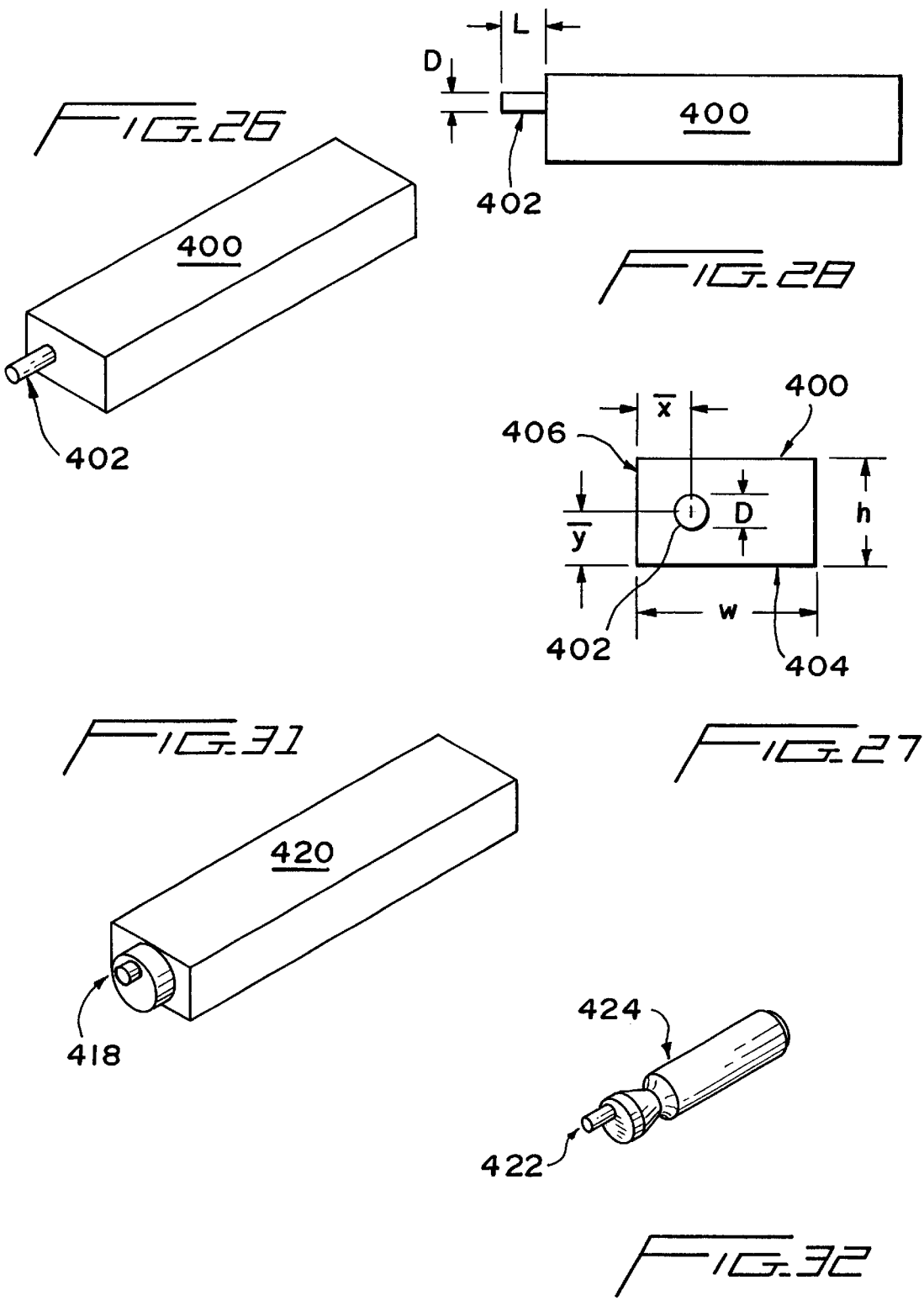

METHOD AND APPARATUS FOR MACHINING A RADIUS OR DIAMETER FEATURE AT NON SYMMETRICAL LOCATIONS ON A WORKPIECE

The present application is a Continuation-In-Part of U.S. application Ser. No. 09/370,177, filed Aug. 9, 1999 now U.S. Pat. No. 6,065,744.

TECHNICAL FIELD

The present invention relates generally to workpiece holders used by machinists and to a method for using specialized workpiece holders to machine radius or diameter defined features at non symmetrical locations on workpieces. More particularly, the invention relates to an improved workpiece holder having a pair of individually adjustable jaws that allow a workpiece to be precisely translated along both X and Y axes while being rigidly retained in a V-block-like holder, and a method of using the holder for simple and rapid job set up to carry out the non symmetrical machining.

BACKGROUND

Machinists have been grappling with the problems of securely clamping and holding workpieces in order to carry out desired machining operations for as long as machine shops have been in existence. Due to the wide variety in sizes and shapes of workpieces, and the wide range of machining operations to be performed on them, machinists are continuously challenged to come up with the right workpiece holder for many unusual or specialized jobs. The venerable V-block emerged early on as the best multipurpose device in this regard, and has served thereafter as the baseline workpiece holder from which a wide range of variants have evolved. No matter what type of workpiece is involved—rectangular, cylindrical, curved castings, or other odd shapes big or small—and regardless of what type of machining operation is to be performed—grinding, drilling, cutting, milling, and so forth—there is most likely some form of V-block that will properly retain the workpiece while the operation is being completed.

Descriptions of typical prior art devices for clamping and holding workpieces during machining operations are found in a number of U.S. patents.

U.S. Pat. No. 1,372,661 to Secord discloses an early (1921) workpiece holding appliance having three separately adjustable jaws, each of which may be individually adjusted in both rotation and traverse.

U.S. Pat. No. 4,340,211 to Chiappetti discloses a V-block clamp having individually adjustable jaws that are directed mainly to holding items having curved outer surfaces, such as cylindrical workpieces. A cylindrical workpiece retained in the clamp disclosed would experience combined up/down as well as left/right movement in response to an adjustment of either jaw.

U.S. Pat. No. 4,583,432 to Bricker discloses a method of centering an article relative to a concentrically rotatable cylinder which includes a slightly adjustable centering member as part of a more or less conventional V-block device.

Additional teachings of various types of prior art workpiece holders are found in U.S. Pat. Nos. 3,887,202 to Zapart, 3,094,821 to Eckert and 1,349,963 to Jerrim.

Despite the generous number of devices and techniques taught in the prior art, it is not uncommon for a tool maker to have to make up special jigs for a particular unusual part or machining task. However, these one time "fixes" are time consuming, often requiring auxiliary elements such as shims, spacers, and the like, and rarely lend themselves to a high degree of precision repeatability for follow on finished articles. Additionally, most V-block based workpiece holders favor carrying out machining operations (especially grinding) at locations on the workpiece which are symmetrical with respect to the outer dimensions of the workpiece. Indeed, to machine or grind a radius or diameter on a workpiece with the center line not symmetrical with its outside surfaces has been declared by many great toolmakers to be one of the most difficult tasks to do or to teach. Even when this particular task is actually accomplished, the repeatability of the process for multiple workpieces remains difficult to achieve. It is precisely this set of needs that the present adjustable jaw workpiece holder meets, thereby satisfying a long standing need for a simple V-block based workpiece holder having a V-point that is rapidly and precisely adjustable along both X and Y axes.

OBJECTS OF THE INVENTION

It is therefore a primary object of the present invention to provide an improved adjustable jaw workpiece holder that overcomes the disadvantages of the prior art approaches.

A co-primary object of the present invention is to provide a method for machining a radius or diameter defined feature at locations on a workpiece that are not symmetrical with respect to the workpiece boundaries.

A further object of the present invention is to provide a workpiece holder having a pair of jaws that are individually adjustable along parallel axes such that the workpiece holder V-point can be smoothly and precisely shifted along a pair of orthogonal axes.

A still further object of the present invention is to provide an adjustable jaw workpiece holder wherein each of a pair of jaws is individually adjustable along a first axis and produces the effect of translating a workpiece retained between them along two axes.

A yet further object of the present invention is to provide an adjustable jaw workpiece holder wherein each of a pair of jaws is individually adjustable in position along first parallel axes responsive to the rotation to an adjusting screw or rack and pinion gearing, and is individually lockable in position responsive to the action of a locking screw or spring loaded cam or other camming action.

A still further object of the present invention is to provide a highly simplified method of establishing the exact workpiece location prior to being machined wherein a pair of orthogonally related dimensions on the workpiece permit rapid set up of the workpiece location for machining features at non symmetrical workpiece locations.

In a number of preferred, alternate and improved embodiments, a dual jawed adjustable workpiece holder is formed as a modified V-block device wherein the V-point may be precisely shifted in fine increments along both X and Y axes in response to movement of one or both jaws along the Y axis.

In preferred embodiments, the adjustable jaw workpiece holder includes a pair of mirror image jaws with workpiece engaging upper surfaces formed at 45 degree angles to yield the well known 90 degree V-block angle. The two jaws are slidably retained in a U-shaped central cavity formed into a rectangular overall device, the cavity defined by at least three walls rising from a base, and each jaw may be raised or lowered within the cavity by means of a lead screw, rack and pinion gearing, or worm gearing which are accessible through openings in the device base. After being set at the desired positions, such that the device's V-point is suitably positioned in the XY plane, individual locking screws or spring loaded or over TDC cams secure the jaws in position. In use, the adjustable jaw workpiece holder is used in combination with various surface grinding machines, clamping means and spin fixtures to implement a method for rapidly and precisely positioning and retaining a workpiece, on which a radius or diameter defined feature is to be machined at a non symmetrical location with respect to the workpiece boundaries, with a high degree of positional repeatability.

BRIEF DESCRIPTION OF THE DRAWINGS

Additional objects and advantages of the invention will become apparent to those skilled in the art as the description proceeds with reference to the accompanying drawings wherein:

FIG. 26 is a perspective view of a rectangular workpiece on which a non symmetrically located feature has been machined using the method facilitated according to the present invention;

FIG. 27 is a top plan view of the rectangular workpiece of FIG. 26;

FIG. 28 is a side elevation of the rectangular workpiece of FIG. 26;

FIG. 31 is a pictorial in perspective of a rectangular workpiece produced using two successive applications of the present inventive method and apparatus to yield a multi-featured machined article; and FIG. 32 is a pictorial in perspective of a cylindrical workpiece having a basic off-centered shaft machined into one end according to the present inventive method and apparatus.

BEST MODE FOR CARRYING OUT THE INVENTION

Figure 1:
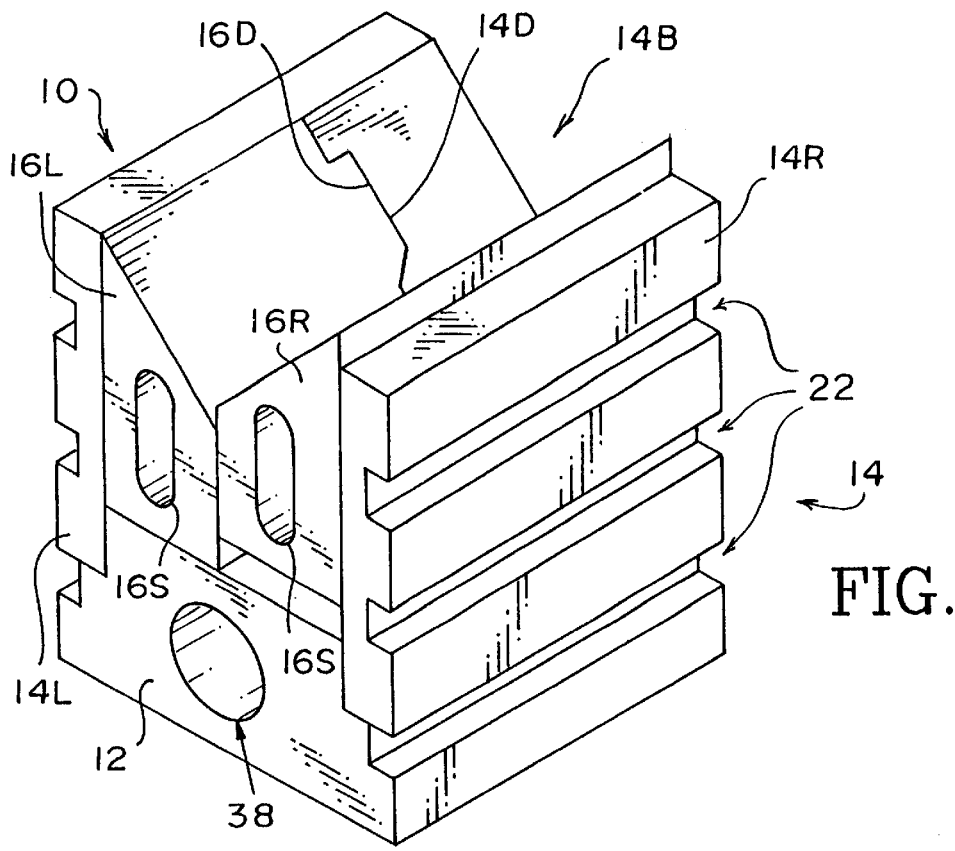
FIG. 1 is a top perspective view of a workpiece holding device having a pair of individually adjustable jaws, according to the present invention.

Referring now to FIG. 1, there is shown a perspective view of a workpiece holding device having a pair of precisely adjustable jaws structured to function according to the present invention. The adjustable jaw workpiece holder 10 includes a base member 12 which carries a frame 14 having a left wall 14L, a right wall 14R and a back wall 14B. Positioned within the rectangular U-shaped opening formed within these three walls are a pair of precisely fitted left and right jaws 16L and 16R which are individually adjustable to slide vertically with respect to each other and with respect to the base member 12 by lead screws to be described below. The vertical movement of this pair of jaws is guided by cooperating dovetail-like track elements 16D and 14D formed into each jaw 16L and 16R, and into the back wall 14B respectively. An upper workpiece engaging face of both jaws is machined at complimentary 45 degree angles such that a workpiece placed into the jaws 16L and 16R is held by the well known 90 degree V-block angle. When the jaws 16L and 16R have been properly positioned, as will be described herein below, they are securely locked into position by individual locking screws (not shown) fitted within racetrack-like shaped slots 16S.

Figure 2:
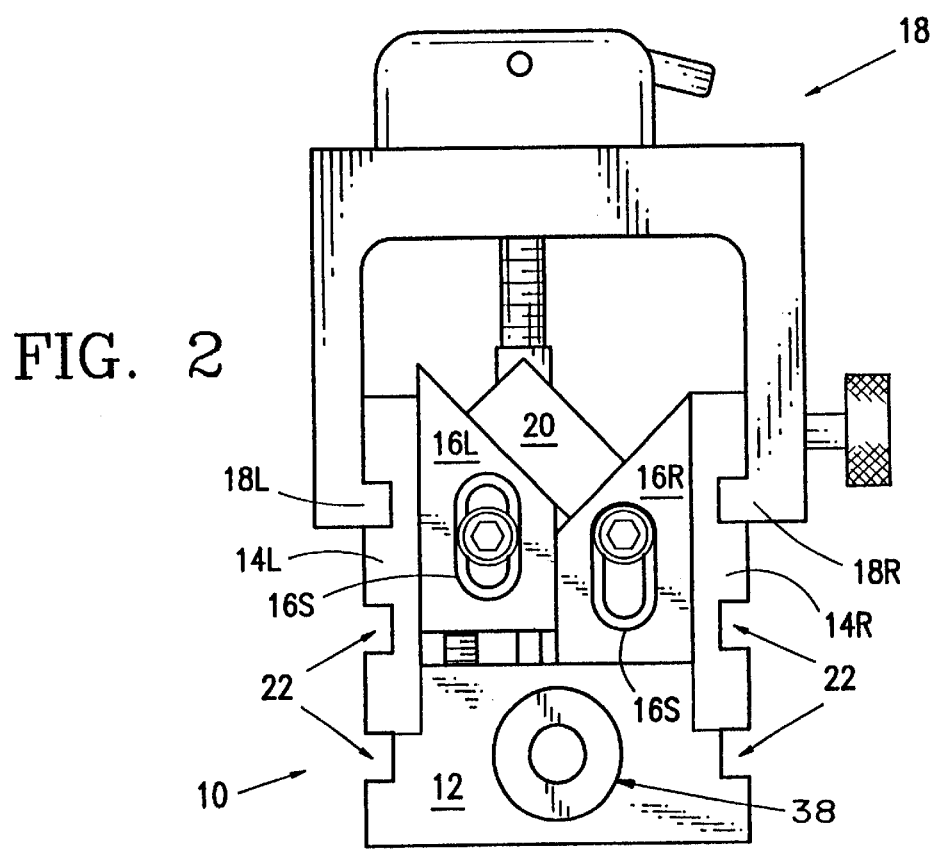
FIG. 2 is a front elevational view of the adjustable jaw holding device of the present invention used in combination with a rapid action cam-lock workpiece clamp.

By way of a brief indication of a typical usage of the adjustable jaw workpiece holder 10, refer to FIG. 2. FIG. 2 is a front elevational view of the adjustable jaw holder 10 deployed in combination with a rapid action cam-lock clamp 18 to securely retain a workpiece 20 in position for machining or grinding. This workpiece holding arrangement is well known to machinists; legs 18L and 18R of the clamp 18 engaging a suitably located pair of slots 22 selected from a plurality of similar slots 22 formed into the outboard faces of the frame walls 14L and 14R. The thus positioned and secured workpiece 20 is then affixed to the bed of a grinding machine, illustratively, for precision grinding or machining of radii in a range of locations on the workpiece. Whereas shims are generally employed within the 90 degree jaws of a fixed V-block device to translate a workpiece up/down or left/right for various positioning purposes, the precise adjustability of the jaws 16L and 16R readily accomplish this translating in a positive and highly repeatable manner. For a detailed description of the action of the cam-lock clamp 18, the interested reader is referred to the teachings of the U.S. Pat. No. 5,005,813, issued in 1991 to Joseph W. Lawrence. The clamp 18 does not, however, form a part of the present invention.

Before proceeding with a detailed description of the structures and functions of the adjustable jaw workpiece holder 10, it is worthwhile to note that the particular structural embodiment set forth in broad terms in connection with the description of FIG. 1 is only one of many configurations that may be employed. For example, while the description has defined a rectangular U-shaped cavity bounded by separate wall, back and base structures to hold the pair of vertically adjustable, lockable jaws, other structural arrangements are equally suitable. In a first preferred embodiment, the three walls forming the frame (14L, 14R and 14B) may be separately made and affixed to the base member 12. Alternatively, these four components may be machined from a single block of material, or precision cast molded as a one piece member. Similarly, the dovetail-tracks as well as the plurality of side notches may be replaced by other interfitting elements having functionally equivalent geometries.

Figure 3:
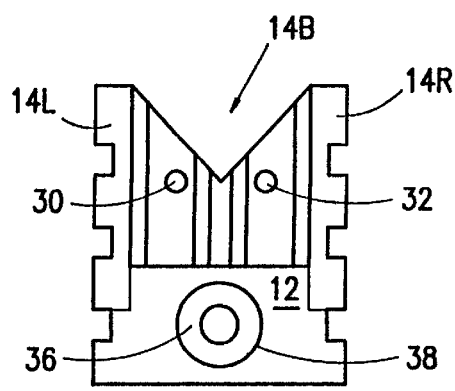
FIG. 3 is a front elevational view of the workpiece holding device of FIG. 1 with the pair of adjustable jaws removed for clarity.
Figure 5:
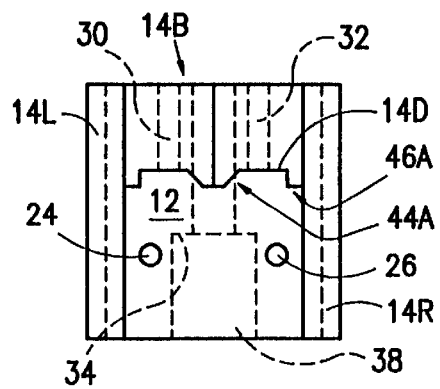
FIG. 5 is a top plan view of the workpiece holding device of FIG. 1, also with the pair of jaws not present.
Figure 8:
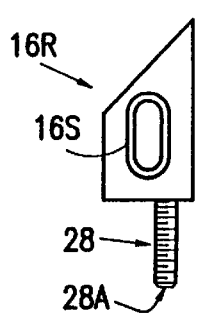
FIG. 8 is a front elevational view of the right jaw including an adjusting screw.
Figure 9:
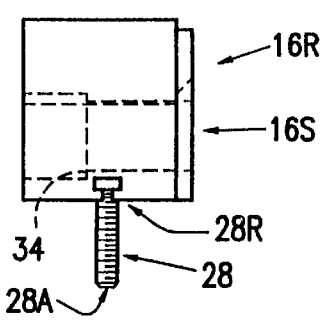
FIG. 9 is a right elevational view of the right jaw of FIG. 8.

The means for adjusting and locking the position of jaws 16L and 16R within the adjustable jaw holder 10 are best seen with reference to FIGS. 3, 5, 8 and 9. FIGS. 3 and 5 shown, respectively, a front elevational view and a top plan view of the adjustable jaw holder 10, and FIGS. 8 and 9 show, respectively, front and right side elevations of the right jaw 16R. Operation of both jaws are essentially identical, their structures being mirror images of each other, so only the action of the right jaw 16R will be described.

A pair of threaded adjusting holes 24 and 26 are formed into the base member 12, as best seen in FIG. 5. The hole 26 receives an adjusting screw 28 rotatably carried by the right jaw 16R, as best seen in FIGS. 8 and 9. When the right jaw 16R is positioned into the corner formed by the right wall 14R and the back wall 14B, such that the sliding dovetail portions 16D and 14D mesh, the screw 28 may be turned to positively establish the desired vertical position of the jaw 16R with respect to the base member 12. An allen wrench routed through the hole 26 via the bottom surface of bottom element 12 into a corresponding hex receptacle at the tip 28A of screw 28 accomplishes the desired vertical jaw adjusting. A T-slot structure 28R at the root of the screw 28 keeps the screw 28 captive within a cavity in the jaw 16R allowing bidirectional jaw adjustment with negligible lost motion. Well known ball joint structures may substitute for the captive T-slot structures. As is well known, the screw pitch sets the advance/retract rate of the jaw 16R, and very finely positioned vernier increments are readily achievable.

A pair of threaded jaw locking holes 30 and 32 are formed into the back wall 14B, as best seen in FIG. 3. The hole 32 receives a locking screw (not shown) routed through the elongated slot 16S of the right jaw 16R such that the head of the locking screw bears against a shoulder 34 formed into the slot 16S to securely lock the jaw 16R against the back member 14B.

In use, after the position of the jaws 16L and 16R have been established and locked, and a workpiece has been suitably positioned and secured (as by the clamp 18 of FIG. 2), then the entire combination may be anchored to the bed of a grinding machine by an anchoring bolt (not shown) which bears on a shoulder 36 of an anchoring bolt channel 38 formed into the base 12.

Figure 4:
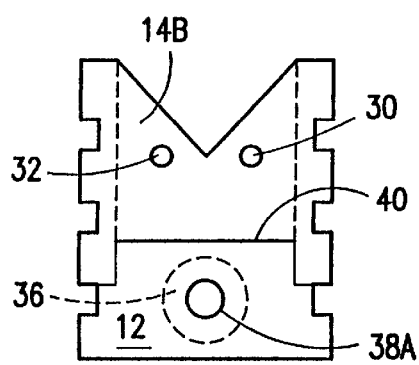
FIG. 4 is a back elevation of the workpiece holding device of FIG. 1.
Figure 6:
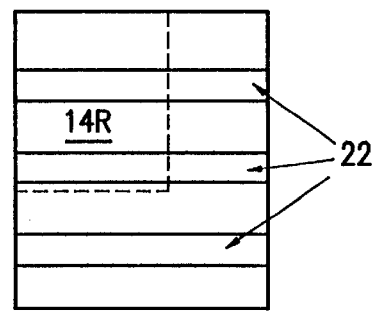
FIG. 6 is a right side elevation of the workpiece holding device of FIG. 1.
Figure 7:
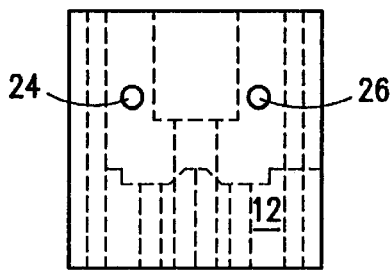
FIG. 7 is a bottom plan view of the workpiece holding device of FIG. 1.
Figure 10:
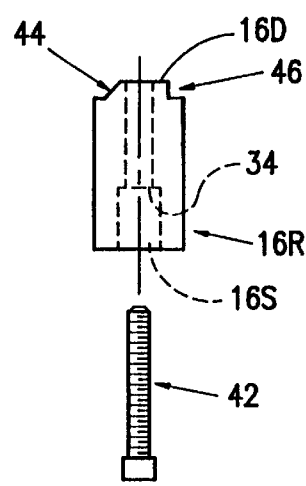
FIG. 10 is a top plan view of the right jaw of FIG. 8.

FIGS. 4, 6, 7 and 10 provide further views of the adjustable jaw holder 10. FIGS. 4, 6 and 7 (as with FIGS. 3 and 5) have been rendered without the inclusion of jaws 16L and 16R for simplicity and clarity. FIG. 4 is a rear elevational view showing the reduced diameter 38A of the anchoring bolt channel as it exits the base member 12, and further shows a line 40 which appears when the adjustable jaw holder 10 is assembled from the distinct components as previously described. For the one piece embodiment, the line 40, would obviously not be present. FIG. 6 shows a right side elevation (depicting the plurality of side slots 22), the left side being a mirror image thereof; FIG. 7 shows a bottom plan view; and FIG. 10 shows a top plan view of the right jaw 16R clearly depicting the extent of the jaw slot 16S, the dovetail-like channel 16D in more detail, and a locking screw 42 which engages the hole 32 (of FIG. 3).

As the locking screw 42 progressively bears on the shoulder 34 formed into jaw locking slot 16S, a sloped wall surface 44 progressively forces the jaw 16R into precise parallel alignment with the Y axis of the device 10. This is accomplished by virtue of its precise mating with an oppositely sloped surface 44A formed into the mating dovetail portion 14D. A track notch 46, rectangular in cross section, also formed into the jaw 16R contributes to the precise translational tracking as the jaw is being locked, as well as when it is being adjustably positioned. This is accomplished by virtue of its precise mating with an oppositely shaped track indentation or shoulder 46A formed into the mating dovetail portion 14D. Both 44A and 46A are best seen with brief reference to FIG. 5.

Figure 11:
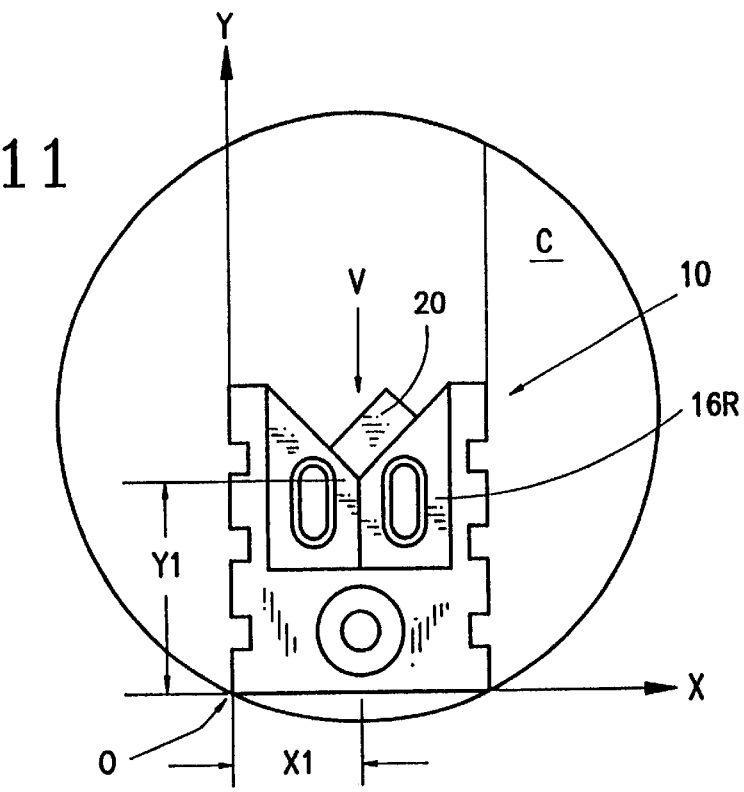
FIG. 11 shows the workpiece holding device mounted in a circular fixture with both adjustable jaws in their bottomed positions.
Figure 12:
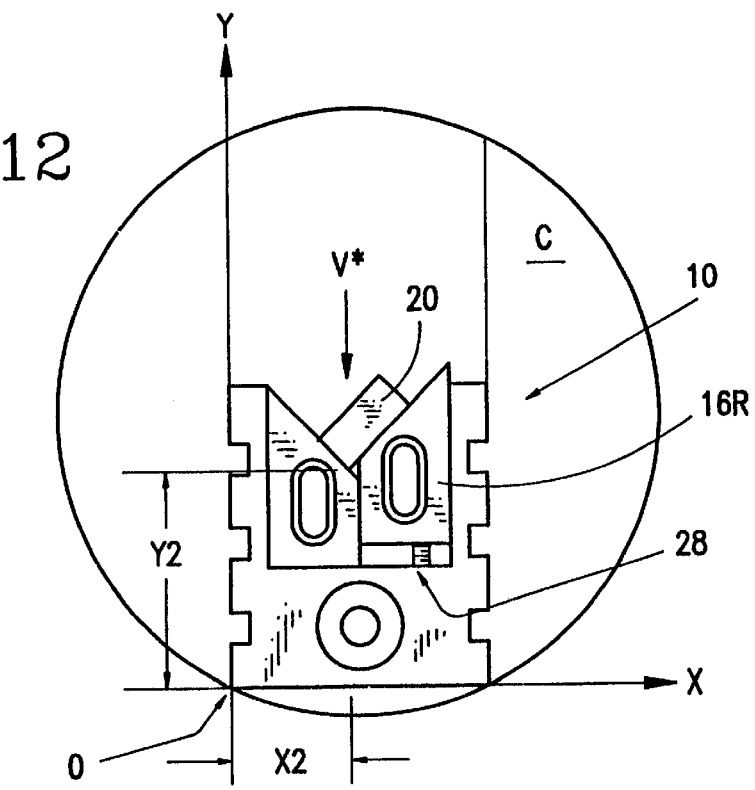
FIG. 12 shows the workpiece holding device mounted in a circular fixture with the right jaw slightly elevated so as to shift the V-point.

As previously indicated, the adjustable jaw workpiece holder 10 functions to smoothly and positively translate a workpiece nestled in its pair of jaws in an XY plane responsive to individual adjusting and locking means. These actions are now described with reference to FIGS. 11 and 12. FIGS. 11 and 12 show a workpiece 20 fitted into a variably positioned V-point "V" of the holder 10, with the holder 10 mounted, illustratively, in a circular rotatable fixture C, as may be called for in specialized applications. With both jaws 16L and 16R in their bottomed (or unelevated, or retracted) positions as shown in FIG. 11, the V-point is located at X and Y coordinates of X1 and Y1 respectively, referenced to the intersection O of the X and Y axes as labeled. The Y axis as shown defines a longitudinal axis for the various holder embodiments. Upon raising the right jaw 16R by advancing the adjusting screw 28, the workpiece 20 is shifted both upwards and to the left as shown by the new coordinates of X2 and Y2 of the translated V-point V*. As expected, one unit of positional change (elevation or +Y movement in this case) of jaw 16R produces 0.5 units of position change in both the X and Y coordinates of the V-point so that Y2 is greater than Y1, and X2 is less than X1. Adjustment of the left jaw 16L (not depicted) would produce similar positional shifts. Thus, positional changes (up or down) in either of the two jaws along axes parallel to each other and also parallel to the Y axis produces precise and positive movement of a retained workpiece in the XY plane, leading to significant improvements in the repeatability of workpiece grinding, especially for problem applications.

Figure 13:
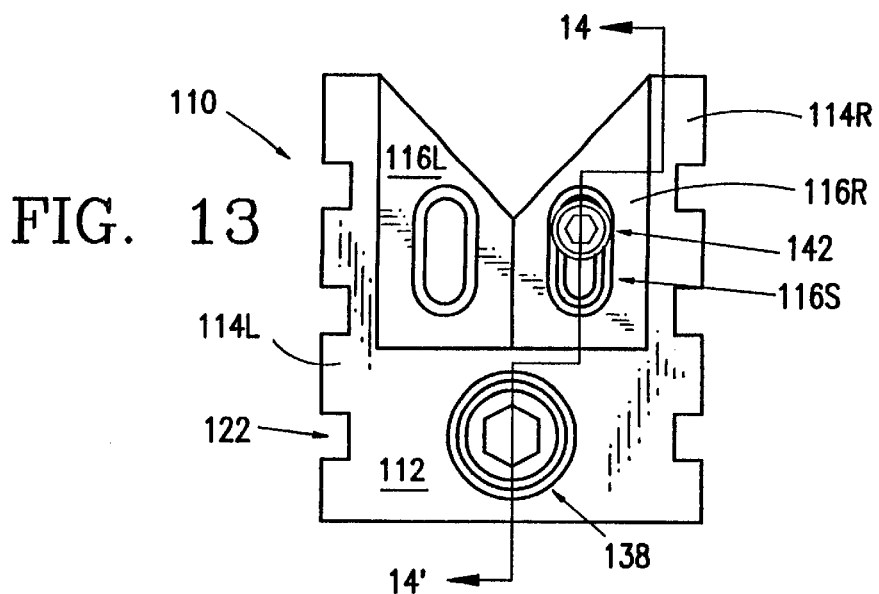
FIG. 13 is a front elevational view of an alternate embodiment of an adjustable jaw workpiece holding device having spring loaded jaw locking and device anchoring means.
Figure 14:
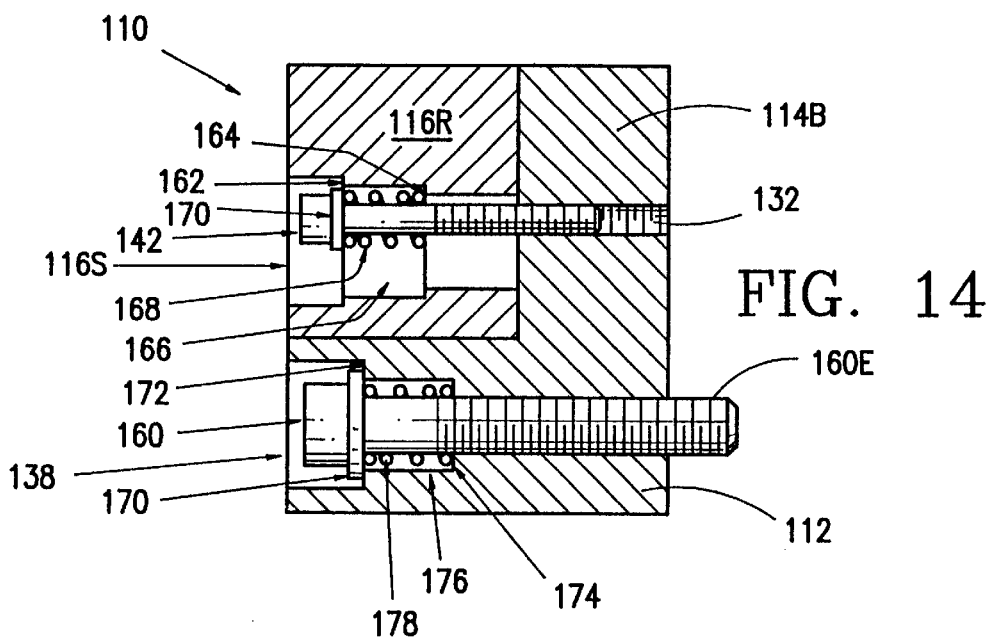
FIG. 14 is a cross sectional view of the alternate device of FIG. 13 taking along the twice shifted viewing lines labeled 14—14'.

An alternate embodiment of the adjustable jaw workpiece holder is shown in the front elevational view of FIG. 13 and in a corresponding cross sectional view of FIG. 14. In this embodiment, a jaw locking screw 142 and a device anchoring bolt 160 provide their locking and anchoring actions via separate helical locking springs. The dovetail sections have been omitted from FIG. 14 for simplicity, and major correspondingly designated components numbered in the 100 series function as those previously described. For the jaw locking action, the spring embodiment is best described with reference to FIG. 14 with occasional reference to FIG. 9. As before, only the action of the right jaw is described. Whereas FIG. 9 shows an elongated locking slot 16S formed to include a single shoulder 34 at the junction of the two slot sizes, the compound cross section of FIG. 14 shows a locking slot 116S having two shoulders 162 and 164 formed into a right jaw 116R. As with the previously described jaw locking slot 16S, the locking slot 116S is racetrack-like in cross section along all of its three distinct regions, with the elongated axis of the racetrack oriented along the Y axis of the device 110. A spring pocket 166 is formed between the outer shoulder 162 and the inner shoulder 164 to house a helical spring 168 deployed around the shaft of the locking screw 142. The spring 168 is chosen to be of suitable dimensions and spring constant for the uses intended. To lock the jaw 116R, the locking screw 142 is progressively advanced into a threaded locking hole 132 formed into a back wall 114B such that the head of screw 142, through an intervening washer 170, bears against the spring 168. The spring 168 in turn bears against the inner shoulder 164 (possibly via a washer, not shown) of the jaw 116R to urge it into the back wall 114B thereby securely locking the jaw 116R. The vertical extent of the locking screw 116S is not shown to scale, so the extent of the allowable vertical motion of the jaw 116R with respect to the diameter of the locking bolt 142 may be greater than that shown. Note that by replacing the washer 170 by one of greater diameter, and/or by using a bolt head large enough to engage the outer shoulder 162, this alternate embodiment may be locked in the same non-spring manner as previously described. Thus, the present alternate embodiment provides a dual function jaw locking capability.

For the device anchoring action, a similar approach is shown wherein a device anchoring bolt 160 may anchor the device 110 to an external machine also through an intervening spring. Again there is shown two shoulders formed into an anchoring bolt channel 138. Between an outer shoulder 172 and an inner shoulder 174 there is formed a spring pocket 176 which houses a helical spring 178 of suitable properties. To anchor the device 110 to an external machine (not shown), the anchor bolt 160 is progressively advanced such that its extremity 160E threadedly engages a mating hole in the external machine causing the head of the bolt 160 through an intervening washer 170 to bear against the spring 178. The spring 178 in turn bears against the inner shoulder 174 (possibly via a washer not shown) of the base member 112 thereby securely anchoring the device 110. Again, the two shouldered approach provides a dual function anchoring action by allowing the bypassing of the spring using larger sized bolt heads and washers, if desired.

Figure 15:
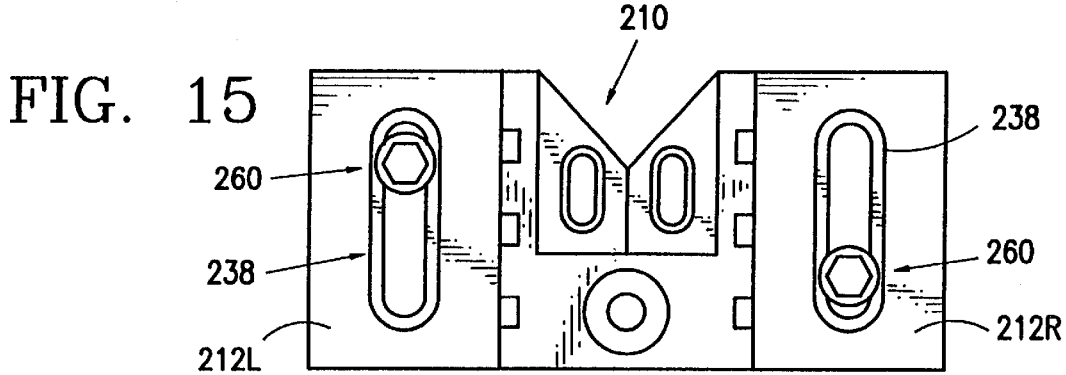
FIG. 15 is an elevational view of an alternate embodiment of an adjustable jaw workpiece holding device having a plurality of device anchoring bolt channels.

There are occasions when using the adjustable jaw workpiece holder 10 of FIGS. 1–10 or 110 of FIGS. 13 and 14 that call for alternate anchoring approaches. Referring to FIG. 15, there is shown a front elevation of a workpiece holder 210 having dual anchor bolt base portions 212L and 213R. The left and right base portions 212L and 212R may be integrally or separately formed, and affixed to the centrally disposed holder 210 by any well known means, such as bolts, clips, welding and the like. Each base portion includes identical racetrack-like shaped anchoring bolt channels 238 which cooperate with separate anchor bolts 260 to anchor the holder 210 to an external machine in the manner described in connection with FIG. 14. However, as the anchor bolt channels 238 are racetrack-like in shape (similar to 16S and 116S), positioning the device 210 in the XY plane allows for a generous amount of rotational freedom, in addition to the benefit of doubling the available anchoring forces needed during heavy machining operations. The anchor slots 260 may be of the dual shouldered type, and may further include springs carried within centrally formed spring pockets thereby providing the previously described dual function anchoring action. Both the locking spring 168 and the anchoring spring 178 may be of alternate geometries, including the well known Belleville spring types Referring now to FIG. 16, there is shown a perspective view of a preferred alternate embodiment of an improved workpiece holding device according to the present invention. The adjustable jaw workpiece holder 310 includes a base member 312 having a pair of base anchor bolt portions. Left and right base anchor bolt portions 312L and 312R may be integrally formed with the base member 312, as by being precisely molded as a unitary member, or may be separately formed and rigidly affixed to the centrally disposed base member 312 by any well known means, such as bolts, clips, welding, and the like. Each base anchor bolt portion includes an identical racetrack-like shaped anchoring bolt channel 338 which cooperates with separate anchor bolts (not shown) to anchor the holder 310 to an external machine in the manner previously described. However, as the anchor bolt channels or slots 338 are racetrack-like in shape (similar to 116S of FIG. 13 and 238 of FIG. 15), positioning the device 310 in the XY plane allows for a generous amount of rotational freedom, in addition to the benefit of doubling the available anchoring forces needed during heavy machining operations. The anchor slots 338 may be of the dual shouldered type, and may further include springs carried within centrally formed spring pockets thereby providing the previously described dual function anchoring action. Both locking springs and anchoring springs (not shown, but similar to locking spring 168 and anchoring spring 178, both of FIG. 14) may be of alternate geometries, including the well known Belleville spring types.

Figure 16:
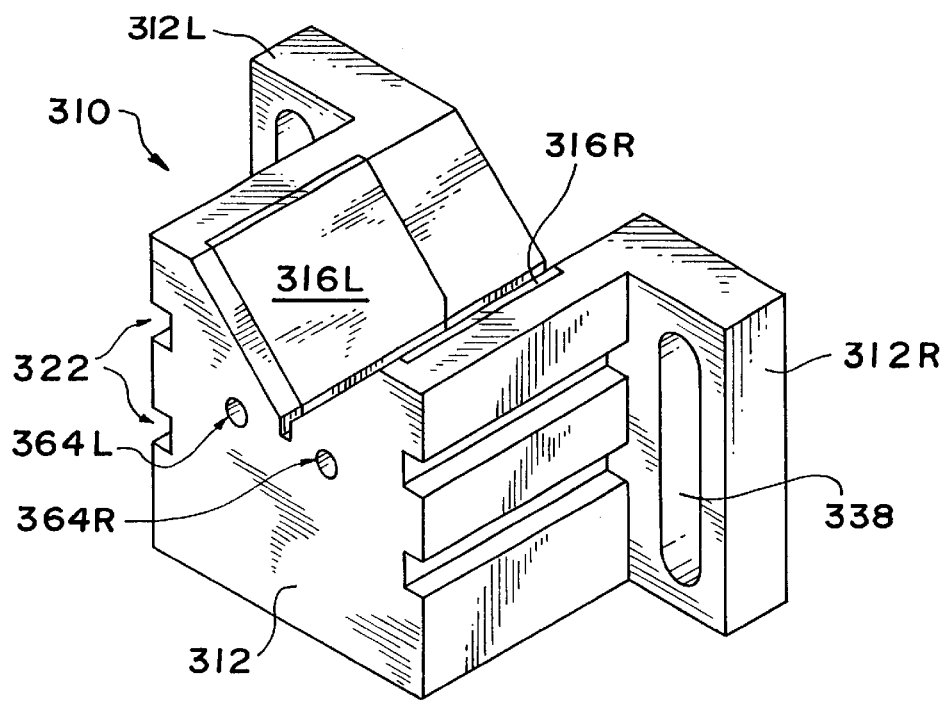
FIG. 16 is top perspective view of a preferred alternate embodiment of an improved workpiece holding device according to the present invention.
Figure 21:
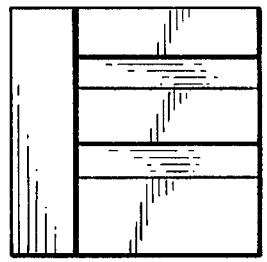
FIG. 21 is left side elevation of the improved workpiece holding device.
Figure 22:
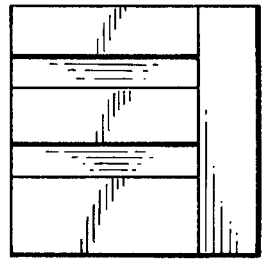
FIG. 22 is a right side elevation of the improved workpiece holding device.

For the sake of brevity, the remaining elements of workpiece holder 310 which function virtually identically to corresponding elements previously described are designated in the 300 numbering series as appropriate on FIG. 16, but are not further discussed. These include elements 316L, 316R, 322S, and the like.

Figures 17, 18:
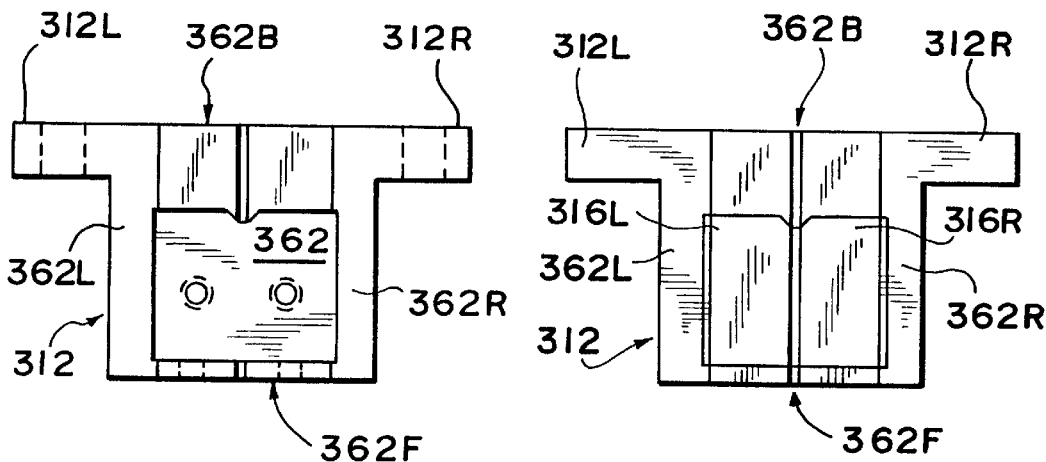
FIG. 17 is a top plan view of the improved workpiece holding device of FIG. 16 with the pair of adjustable jaws removed for clarity.
FIG. 18 is a top plan view of the improved workpiece holding device of FIG. 16 including the pair of workpiece jaws in their normal positions.
Figures 19, 20:
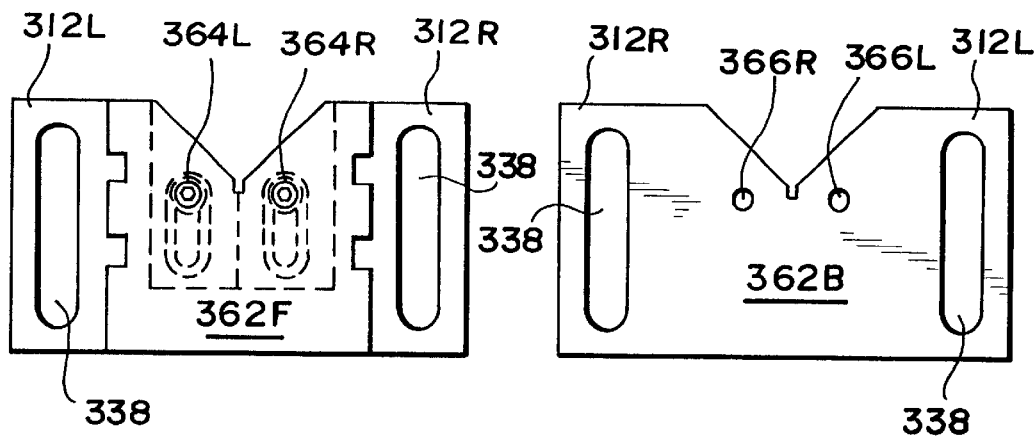
FIG. 19 is a front elevational view of the improved workpiece holding device.
FIG. 20 is a back elevational view of the improved workpiece holding device.

With reference to the top plan views of FIGS. 17 and 18, as well as the front and rear elevational views of FIGS. 19 and 20, the primary differences between the improved embodiment of FIG. 16 and the previously described embodiments are clarified. Worthy of note is the shape of a substantially rectangular cavity 362 formed centrally within base member 312. The cavity 362 has a back wall portion 362B, a front wall portion 362F, and left and right side wall portions 362L and 362R, respectively, all of which may be integrally formed as part of base member 312. The cavity 362 itself is best seen in FIG. 17, while FIG. 18 shows a pair of adjustable jaws 316L and 316R located in their normal operating positions within the cavity 362.

On the front wall 362F is formed a pair of access holes 364L and 364R via which the pair of adjustable jaws (shown in phantom, or with reference to FIGS. 23–25) may be loosened and locked. While access to the jaw locking screws is via access holes 364L and 364R, momentary reference to the back elevational view of FIG. 20 shows a pair of aligned holes 366L and 366R which are interiorly threaded to receive locking screws (not shown) routed through the elongated slots of the right and left jaws, as previously described.

Figure 23:
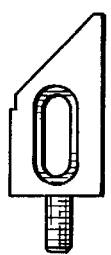
FIG. 23 is a front elevation of the right adjustable jaw including an adjusting screw.
Figure 24:
FIG. 24 is a right elevation of the right adjustable jaw of FIG. 23.
Figure 25:
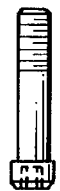
FIG. 25 is a top plan view of the right adjustable jaw of FIG. 23.

Reference to FIGS. 23, 24 and 25 provide the details of one the adjustable jaws. FIG. 23 is a front elevation of the right adjustable jaw 316R including an Allen head adjusting screw 328, and an elongated locking slot 316S. FIG. 24 is a right elevation of the right jaw 316 showing the T-slot structure 328T. FIG. 25 is a side elevation of an Allen head jaw locking screw 342, which cooperates with the elongated locking slot 316S. Functionally, these elements operate virtually identically to the jaw action described in connection with the embodiments of FIGS. 8, 9 and 10. One key distinction between the improved embodiment of FIG. 16 and the previously described embodiments is the contemplation of using alternate means for both adjusting and locking the adjustable jaws 316L and 316R. Whereas previous descriptions described the use of threaded screws for both of these functions, the improved embodiment may employ other fully equivalent means for these purposes. Therefore, the adjusting screw 328 and T-slot 328T arrangement may be replaced by rack and pinion gears, worm gear/worm wheel pairs, and similar well known and conventional mechanical means for precisely and minutely advancing an element in translation by applying a rotary input control force. In like manner, the adjustable jaw locking screw 342 of FIG. 25 may be replaced by spring loaded cams, over-top-dead-center clamps, and similar well known and conventional mechanical means for rapidly and firmly locking a pair of members securely together by application of a modest input control force.

All of the baseline embodiments previously described, as well as the improved alternate embodiment of FIGS. 16–25 function to smoothly and positively translate a workpiece carried in its pair of jaws in an XY plane responsive to the various types of individually adjusting and locking means included. With brief reference back to FIGS. 11 and 12, it is clear how movement along the Y axis of either jaw produces workpiece movement along both the X and Y axes. This compound motion and precise adjustability serves as the basis of a unique and highly valuable machining technique heretofore not readily achievable. The technique is best described as a method for machining, grinding, milling, drilling, etc. (hereinafter referred to collectively as "machining" only, for economy of language) features on a workpiece where the feature being formed is located at a position on a workpiece which is not symmetrical with respect to the workpiece boundaries.

As a baseline example, consider the workpiece 400, a perspective view of which is shown in FIG. 26. Workpiece 400 is an elongated rectangular member on which a cylindrical shaft 402, the feature of interest, has been machined into one end. The exact central axis location of the shaft 402 is best seen with respect to the end wall boundaries (with height h and width w) in top plan view of FIG. 27. The extent of shaft 402 (length L) is seen in a right side elevation of FIG. 28. (FIGS. 26, 27 and 28 are not shown strictly to scale.) Note that the shaft 402 has a diameter D whose central longitudinal axis a is located a distance $\bar{y}$ (pronounced "wye bar") up from a bottom edge boundary 404 of workpiece 400, and a distance $\bar{x}$ (pronounced "ex bar") to the right of a left side edge boundary 406.

Precision machining of the shaft feature 402 at this non symmetrical location is an unusually difficult task for a machinist to carry out, and is considered one of the most difficult tasks to teach to an apprentice machinist. Generally, this task is accomplished by machinists on a surface grinding machine by clamping the workpiece in a V-block, and mounting the V-block plus workpiece in a well known Harig or similar 'spin' fixture, where the fixture is then rotated about a first bed axis to machine the outer circumference of the shaft. A cutting tool of suitable type rotating about a second machine axis does the actual machining. To establish the proper location of the desired central axis of a shaft 402, workpieces such as that of workpiece 400 are positioned in a conventional fixed jaw V-block workpiece holder, and shims are added empirically until the desired feature located machining is accomplished. Needless to say, finding the exact shaft center relative location is largely a cut and try process until the right size and number of shims are determined. This is not only time consuming, it also tends to produce many scrap pieces. Most important, however, it is very difficult to maintain a high degree of precision and repeatability when machining a large number of workpieces using this and other traditional methods. The present workpiece holding device, with its precisely adjustable jaws, when used in conjunction with the method of the present invention, is admirably suited to handle exactly this type of difficult machining task. Actually, the present apparatus and method provide surprising simplicity in initial set up, and a very high degree of repeatability for a wide range of tasks of this and related kinds.

Figure 30:
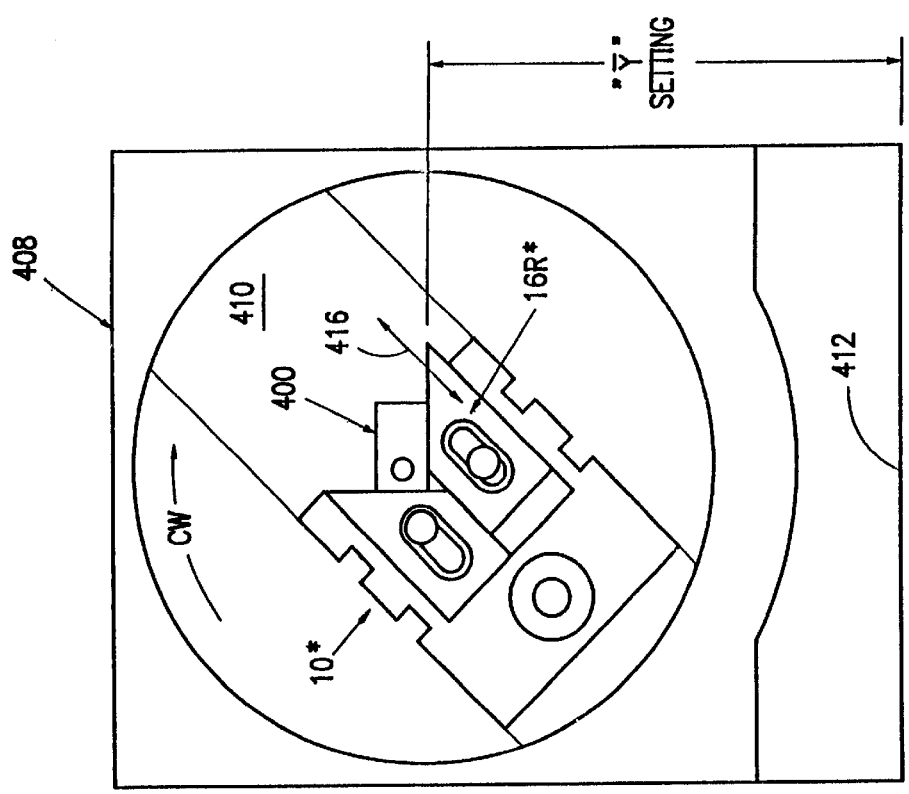
FIG. 30 shows the elements and devices of FIG. 29 in a subsequent method step wherein the spin fixture has been rotated 90 degrees and an adjustable jaw has been adjustably elevated.
Figure 29:
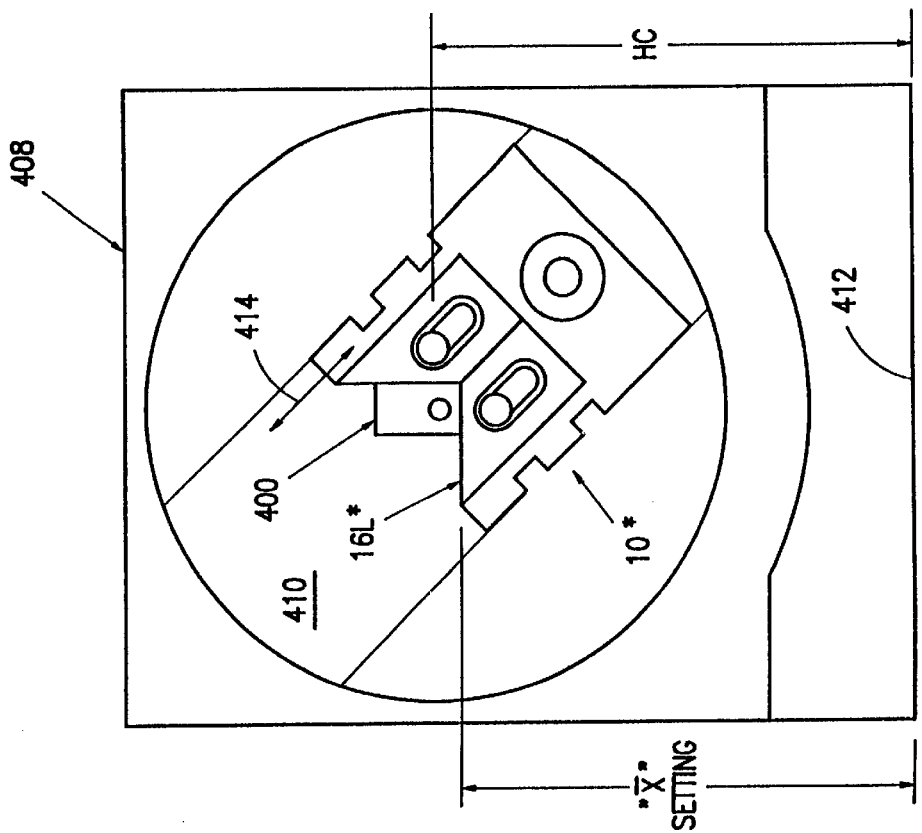
FIG. 29 is a highly schematic diagram showing the ideal positioning of the various elements and devices needed to practice the present inventive method.

Referring now to FIGS. 29 and 30 there is shown in highly schematic form the heart of the machining method made possible via the present invention. As a first step, the $\bar{x}$ and $\bar{y}$ dimensions of the feature to be machined are determined with respect to the outside edges, or boundaries, of the workpiece. In FIG. 27, presume that the precise properly oriented measurements had found that the desired $\bar{x}$ dimension is 0.150 inches and that the desired $\bar{y}$ dimension is 0.100 inches. In FIG. 29 an illustrative Harig "Grind All" rotatable or spin fixture 408 is shown having a constant center height HC of precisely 3.00 inches, a retaining channel 410 with parallel walls, and a reference boundary 412. An adjustable jaw V device, such as the workpiece holder 10* (or 10, 110, 210 or 310 as described above) is inserted in the spin fixture. With the workpiece 400 positioned into the V-point as shown (with both jaws fully retracted and each of the chosen two boundary points in contact with one of the 45 degree jaw surfaces), the dimension $\bar{x}$ (0.150") is subtracted from the HC dimension of 3.00" to yield 2.850". V device 10* is then moved by translation within the Harig fixture retaining channel 410 (along the arrow 414) until the upper edge of 16L* is measured to be 2.850" from the reference boundary 412, designated as the "$\bar{X}$" setting. The V device 10* is then locked by screw(s) or cam(s) with respect to the retaining channel 410. The entire fixture 408 is then rotated 90 degrees clockwise, for example, as shown by a curved arrow CW in FIG. 30, ready for the second and final set up step. The dimension $\bar{y}$ (0.100") is subtracted from the HC dimension of 3.00" to yield 2.900". An adjustable jaw, in the present example 16R*, is then unlocked and elevated by screws or rack and pinion gears until the upper edge of 16R* is measured to be 2.900" from the reference boundary 412, designated as the "$\bar{Y}$" setting. The jaw 16R* is then locked, the workpiece clamped to the V device, and the machining process can be started. Nothing could be more simple or more elegant, a truly surprising method. Simple, precise, and highly repeatable workpiece after workpiece.

This basic method is readily expandable to accomplish significantly more complex workpiece features. For example, two applications of the above method will readily produce the multi featured shapes 418 of FIG. 31 on a rectangular workpiece 420, or the basic off-centered shaft feature 422 on a cylindrical workpiece 424 of FIG. 32. Additionally, the above method is amenable to quite a bit of variations to accommodate a wide range of feature types, workpiece geometries, machine operation types, and definitions of X and Y axes on either workpieces or rotatable mounting fixtures. All that is required is a translation of an adjustable jaw V device in a first rotatable fixture orientation to position the first feature axis along a first axis setting, rotation of the fixture by 90 degrees, and then moving at least one adjustable jaw of the V device to position the second feature axis along a second orthogonal axis setting.

The application of the present method to workpieces of rectangular or circular cross sections has been clearly shown. However, a close review of the diversity available via the $\bar{x}/\bar{y}$ method disclosed above clearly indicates its applicability to workpieces of other cross sections— obviously including those of regular cross sections such as ellipses, ovals, trapezoids, and the like. Additionally, irregular cross sections that defy easy characterizations are also readily accommodated. All that is required is an $\bar{x}$ and a $\bar{y}$ dimension, as determined from a pair of workpiece boundary points which can be brought into contact with a pair of orthogonal V device jaws, at least one jaw of which is adjustable as described.

The generality of the present inventive method is assured by noting that the use of the particular Harig spin fixture described is not the only fixture employable. While the illustrative method steps are set forth with respect to a Harig model "Grind All" fixture readily available from the Harig Manufacturing Corp. of Chicago, Ill., other fixtures well known to professional machinists may also serve. Typical alternately useable fixtures include the "Surburban Master Grind" model made by Surburban Tool, Inc. Of Birmingham, Mich., and the "Toolmakers Delight" model manufactured by Imperial Newbould of Meadville, Pa.

Although the invention has been described in terms of a selected preferred embodiment and in particular a number of preferred, alternate and improved apparatus embodiments, the invention should not be deemed limited thereto since other embodiments and modifications, especially in the broad machining method disclosed, will readily occur to one skilled in the art. It is therefore to be understood that the appended claims are intended to cover all such modifications as fall within the true spirit and scope of the invention.

What is claimed is:

1. A method of machining a radius or diameter defining a workpiece feature at a non symmetrical location on a workpiece, comprising the steps of:

a) determining a first distance between a central axis of said feature and a first boundary point on said workpiece, and determining a second distance between said central axis and a second orthogonally disposed workpiece boundary point;

b) positioning the workpiece in a 90 degree V device having a pair of parallelly adjustable jaws such that each of said boundary points is in contact with one of the jaw surfaces of said V device;

c) placing the V device carrying said positioned workpiece in a rotatable fixture having a known constant center height, a fixed reference boundary and a parallel side retaining channel, said rotatable fixture oriented in a first angular direction;

d) translating the V device along said parallel fixture retaining channel until the distance between said first boundary point and said fixed reference boundary is equal to the difference between said constant center height and said first distance, and anchoring said V device at that location in said parallel side retaining channel;

e) rotating said rotatable fixture to a second angular direction orthogonal to said first angular direction;

f) adjusting one of said adjustable jaws until the distance between said secondary boundary point and said fixed reference boundary is equal to the difference between said constant center height and said second distance, and locking said adjustable jaw at that location; and g) whereby upon engaging said positioned and locked workpiece in a machining action, said desired workpiece feature is formed.

2. The method of claim 1 wherein said workpiece feature is cylindrical in shape and is located at one end surface of a workpiece having a regular cross section, said central axis being a longitudinal axis of said cylindrical shape and oriented orthogonally to said one end surface whereby said machining action is facilitated.

3. The method of claim 2 wherein said first distance is established by determining the distance between said central axis and a first boundary point on an edge of said end surface and said second distance is established by determining the distance between said central axis and a second boundary point on a second edge of said end surface such that the angle subtended between said central axis and said boundary points is a right angle.

4. The method of claim 1 wherein said workpiece feature is cylindrical in shape and is located at one end surface of a workpiece having a cross section chosen from the group containing regular and irregular cross sections, and selecting said first and second boundary points as those points on said end surface which contact a right angle device into which said workpiece is placed.

* * * * *